US012400210B1

(12) United States Patent
Ramanathan et al.

(10) Patent No.: US 12,400,210 B1
(45) Date of Patent: Aug. 26, 2025

(54) CASH DELIVERY SERVICE

(71) Applicant: Wells Fargo Bank, N.A., San Franciso, CA (US)

(72) Inventors: Ramanathan Ramanathan, Bellevue, WA (US); Vincent Le Chevalier, San Jose, CA (US)

(73) Assignee: Wells Fargo Bank, N.A., San Francisco, CA (US)

( * ) Notice: Subject to any disclaimer, the term of this patent is extended or adjusted under 35 U.S.C. 154(b) by 262 days.

(21) Appl. No.: 17/585,803

(22) Filed: Jan. 27, 2022

Related U.S. Application Data

(63) Continuation of application No. 15/730,204, filed on Oct. 11, 2017, now Pat. No. 11,276,055.

(51) Int. Cl.
 *G06Q 20/32* (2012.01)
 *G06Q 20/10* (2012.01)
 *G06Q 20/36* (2012.01)
 *G06Q 20/40* (2012.01)
 *G06Q 40/04* (2012.01)

(52) U.S. Cl.
 CPC ..... *G06Q 20/3223* (2013.01); *G06Q 20/1085* (2013.01); *G06Q 20/3221* (2013.01); *G06Q 20/3674* (2013.01); *G06Q 20/40145* (2013.01); *G06Q 40/04* (2013.01)

(58) Field of Classification Search
 None
 See application file for complete search history.

(56) References Cited

U.S. PATENT DOCUMENTS

| | | |
|---|---|---|
| 5,367,561 A | 11/1994 | Adler et al. |
| 6,045,039 A | 4/2000 | Stinson et al. |
| 7,249,069 B2 | 7/2007 | Alie et al. |
| 7,653,585 B2 | 1/2010 | Guerra |
| 7,861,922 B2 | 1/2011 | Lee et al. |
| 8,157,164 B1 | 4/2012 | Billman |
| 8,306,510 B2 | 11/2012 | Garcia et al. |
| 8,504,450 B2 | 8/2013 | Shastry |
| 8,538,845 B2 | 9/2013 | Liberty |
| 8,554,671 B2 | 10/2013 | Ballout |
| 9,014,662 B1 | 4/2015 | Gailloux et al. |
| 9,092,777 B1 | 7/2015 | Gaspar |
| 9,398,018 B2 | 7/2016 | MacGregor et al. |
| 10,453,041 B1 | 10/2019 | Walker et al. |
| 10,540,644 B1 | 1/2020 | Walker et al. |
| 2002/0087465 A1 | 7/2002 | Ganesan et al. |
| 2003/0229548 A1 | 12/2003 | Kakuta |
| 2004/0215566 A1 | 10/2004 | Meurer |
| 2006/0059023 A1 | 3/2006 | Mashinsky |
| 2006/0253335 A1 | 11/2006 | Keena et al. |
| 2007/0265984 A1 | 11/2007 | Santhana |
| 2010/0106644 A1 | 4/2010 | Annan et al. |

(Continued)

*Primary Examiner* — Divesh Patel
(74) *Attorney, Agent, or Firm* — Kilpatrick Townsend & Stockton LLP

(57) ABSTRACT

The innovation disclosed and claimed herein, in one aspect thereof, comprises systems and methods of delivering cash to a subscriber of a cash delivery service by way of a courier. In another aspect, collection of cash from a subscriber by a courier is contemplated. Conversely, the subscriber prearranging to pick up cash at a kiosk is contemplated. For these and like embodiments, network servers host a cash delivery application and users/couriers utilize the application as clients.

20 Claims, 7 Drawing Sheets

(56) References Cited

U.S. PATENT DOCUMENTS

| | | |
|---|---|---|
| 2010/0250436 A1 | 9/2010 | Loevenguth et al. |
| 2012/0267432 A1 | 10/2012 | Kuttuva |
| 2012/0310824 A1 | 12/2012 | Liberty |
| 2013/0031009 A1* | 1/2013 | Kapoor .............. G06Q 20/3278 705/77 |
| 2013/0124410 A1* | 5/2013 | Kay ...................... G07F 19/211 705/43 |
| 2013/0124411 A1 | 5/2013 | Kobres et al. |
| 2013/0240622 A1 | 9/2013 | Zhou et al. |
| 2014/0279542 A1 | 9/2014 | Baird et al. |
| 2015/0073936 A1 | 3/2015 | Peterson et al. |
| 2016/0034875 A1 | 2/2016 | Stevens et al. |
| 2016/0078417 A1* | 3/2016 | DeLuca ................. G07F 9/001 705/43 |
| 2016/0140542 A1* | 5/2016 | Hammad ........... G06Q 20/3674 705/67 |
| 2017/0053249 A1 | 2/2017 | Tunnell et al. |
| 2017/0053268 A1 | 2/2017 | Pande |
| 2017/0076274 A1 | 3/2017 | Royyuru et al. |
| 2017/0090484 A1 | 3/2017 | Obaidi |
| 2017/0093657 A1* | 3/2017 | Angus ..................... H04L 43/16 |
| 2017/0124542 A1* | 5/2017 | Sharan ................... G06Q 40/02 |
| 2017/0124789 A1* | 5/2017 | Rephlo ................. G07C 9/257 |
| 2017/0161744 A1* | 6/2017 | Gupta ................. G06Q 20/10 |
| 2017/0162004 A1* | 6/2017 | Hughes ................ G07F 19/203 |
| 2017/0192635 A1 | 7/2017 | Jones-McFadden et al. |
| 2017/0262824 A1 | 9/2017 | Singh |
| 2017/0308851 A1 | 10/2017 | Beach-Drummond |

* cited by examiner

CASH DELIVERY SERVICE

CROSS-REFERENCE TO RELATED APPLICATIONS

This application claims the benefit and is a continuation of U.S. patent application Ser. No. 15/730,204, filed Oct. 11, 2017, U.S. Pat. No. 11,276,005, issued on Mar. 15, 2022, and entitled "CASH DELIVERY SERVICE," the entirety of which is incorporated herein by reference.

BACKGROUND

Despite the transition to a largely cashless economy, there remains a need for paper money in a number of common daily situations. Travelers abroad may be in urgent need of local currency. Alternatively, one may patronize a shop only to find that automatic teller machine (ATM) cards or credit cards are not accepted forms of payment. In the event of a misplaced or lost wallet, one may be unable to secure cash through traditional means.

In the event that a traveler abroad has U.S. dollars and nearby money changers are charging unconscionable transaction fees, an alternative means of exchanging money is preferable.

A portable, secure, means of accessing cash virtually anywhere and at virtually any time is beneficial.

BRIEF SUMMARY OF THE DESCRIPTION

Embodiments of the innovation described herein address conventional shortcomings and/or achieve other advantages. The following presents a simplified summary of the innovation in order to provide a basic understanding of some aspects of the innovation. This summary is not an extensive overview of the innovation. It is not intended to identify key/critical elements of the innovation or to delineate the scope of the innovation. Its sole purpose is to present some concepts of the innovation in a simplified form as a prelude to the more detailed description that is presented later.

The innovation disclosed and claimed herein, in one aspect thereof, comprises systems and methods of delivering cash to a user in a cash delivery network. In aspects, cash may be delivered to a user by a courier in a personal automobile or by an automated vehicle (e.g., car, drone, etc.) serving as a mobile ATM (automated teller machine). Alternatively, a user may request to pick up cash at a designated location in person.

A system of the innovation can include two mobile devices (e.g., cellular phones) connected to a cash delivery network (CDN). A CDN server hosts a cash delivery application. The user connects to the CDN via a mobile phone. A courier also connects to the network via a mobile phone. The user and courier access the cash delivery application as clients. The user and courier are connected to servers associated with their respective financial institutions. Upon approval by the CDN server of a cash request made by the user, the courier delivers cash to the user. Immediately thereafter (or simultaneously therewith), an electronic funds transfer is made from the bank account of the user to the bank account of the courier.

In aspects, the subject innovation provides substantial benefits in terms of convenience. One advantage is that users may receive cash without leaving their present location. Another advantage is that users may access cash even when their credit cards, ATM cards, or identification cards are unavailable.

To the accomplishment of the foregoing and related ends, certain illustrative aspects of the innovation are described herein in connection with the following description and the annexed drawings. These aspects are indicative, however, of but a few of the various ways in which the principles of the innovation can be employed and the subject innovation is intended to include all such aspects and their equivalents. Other advantages and novel features of the innovation will become apparent from the following detailed description of the innovation when considered in conjunction with the drawings.

BRIEF DESCRIPTION OF THE DRAWINGS

Aspects of the disclosure are understood from the following detailed description when read with the accompanying drawings. It will be appreciated that elements, structures, etc. of the drawings are not necessarily drawn to scale. Accordingly, the dimensions of the same may be arbitrarily increased or reduced for clarity of discussion, for example.

DETAILED DESCRIPTION

Figure 1:
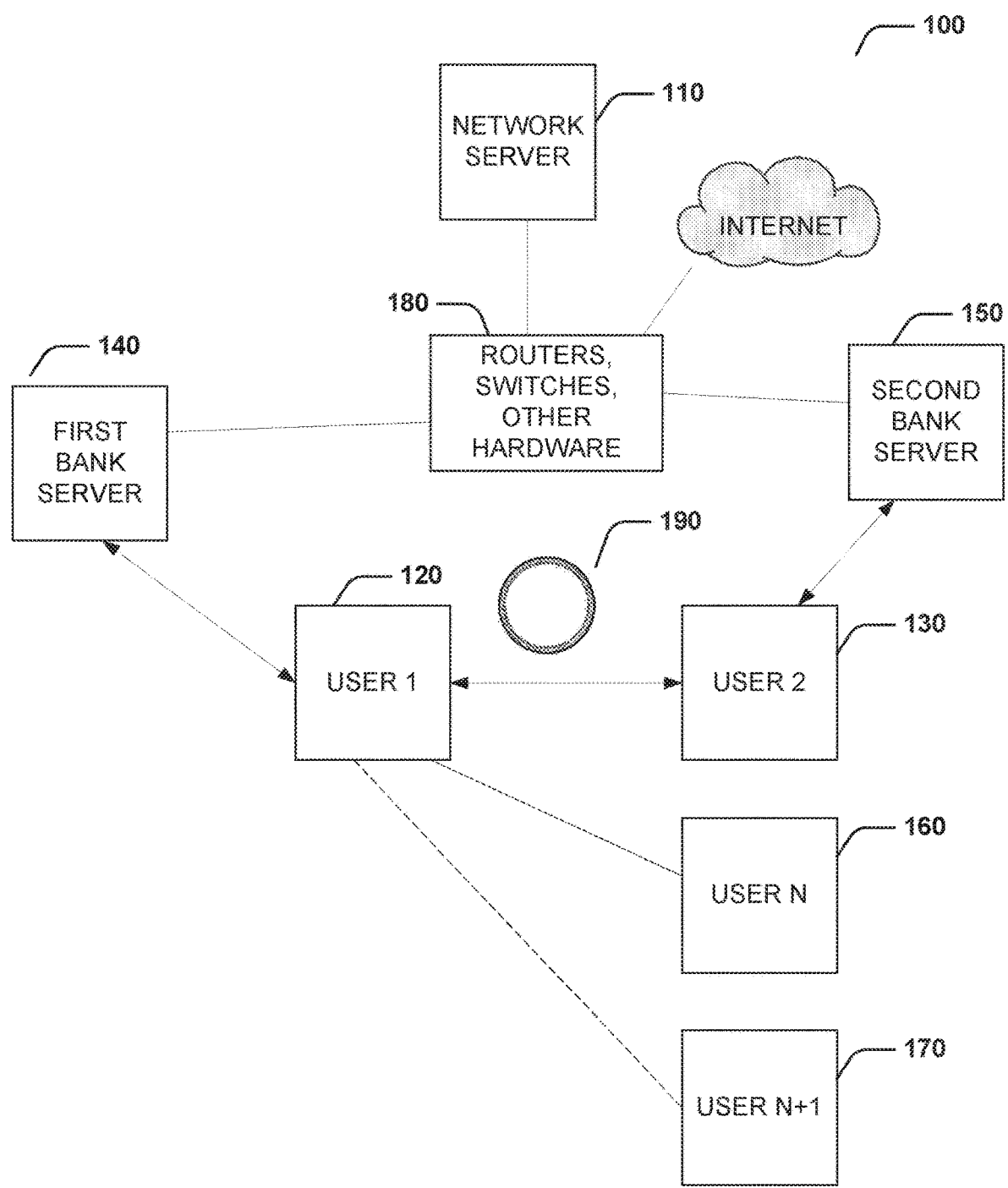
FIG. 1 illustrates an example system block diagram of a cash delivery network that facilitates the delivery of cash to a network users by means of courier.

The innovation is now described with reference to the drawings, wherein like reference numerals are used to refer to like elements throughout. In the following description, for purposes of explanation, numerous specific details are set forth in order to provide a thorough understanding of the subject innovation. It may be evident, however, that the innovation can be practiced without these specific details. In other instances, well-known structures and devices are shown in block diagram form in order to facilitate describing the innovation.

As used in this application, the terms "component", "module," "system", "interface", and the like are generally intended to refer to a computer-related entity, either hardware, a combination of hardware and software, software, or software in execution. For example, a component may be, but is not limited to being, a process running on a processor, a processor, an object, an executable, a thread of execution, a program, or a computer. By way of illustration, both an application running on a controller and the controller can be a component. One or more components residing within a process or thread of execution and a component may be localized on one computer or distributed between two or more computers.

Furthermore, the claimed subject matter can be implemented as a method, apparatus, or article of manufacture using standard programming or engineering techniques to produce software, firmware, hardware, or any combination thereof to control a computer to implement the disclosed subject matter. The term "article of manufacture" as used herein is intended to encompass a computer program accessible from any computer-readable device, carrier, or media. Of course, many modifications may be made to this configuration without departing from the scope or spirit of the claimed subject matter.

While certain ways of displaying information to users are shown and described with respect to certain figures as screenshots, those skilled in the relevant art will recognize that various other alternatives can be employed. The terms "screen," "web page," "screenshot," and "page" are generally used interchangeably herein. The pages or screens are stored and/or transmitted as display descriptions, as graphical user interfaces, or by other methods of depicting information on a screen (whether personal computer, PDA, mobile telephone, or other suitable device, for example) where the layout and information or content to be displayed on the page is stored in memory, database, or another storage facility.

Figure 2:
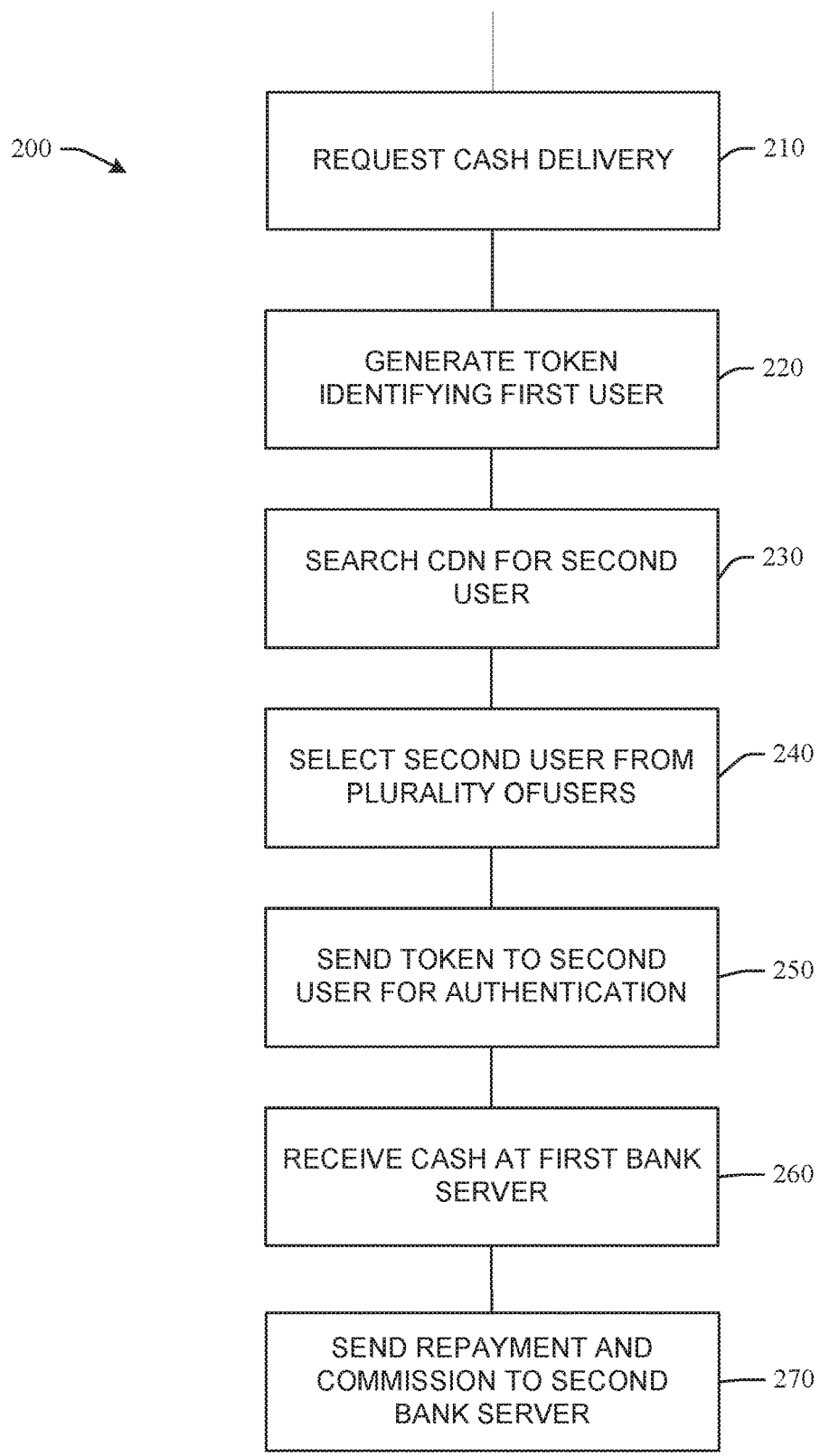
FIG. 2 illustrates an example flow diagram indicative of the method of operation of the system depicted in FIG. 1.

FIGS. 1 and 2 are directed toward access and delivery of cash from a courier to a network user or subscriber. While these figures (and the figures that follow) describe specific examples of a cash delivery system in accordance with the innovation, it will be appreciated that alternative aspects exist that are to be included within the spirit and scope of the innovation as described herein.

FIG. 1 illustrates an example system block diagram of a cash delivery network (CDN) 100, managed by a CDN server 110 that facilitates the delivery of cash to a first network user 120 by means of courier (second user) 130 chosen from among a plurality of potential second users (130, 160, 170). The CDN server 110 hosts a cash distribution application that facilitates the access, transfer and delivery of funds in accordance with aspects of the innovation. Network users (120, 130, 160, 170) access the cash delivery application as clients. The CDN 100 contains routers, switches, and other appropriate hardware 180 and connects to the internet or other suitable network.

In operation, the first network user 120 requests cash delivery. In response, a first bank 140 server associated with a first financial institution, associated with the first user 120, generates a token 190. In this example, the token is a commitment to pay money online. In this instance, the commitment is to pay a potential second user upon receipt of cash. The token 190 may include at least a phone number (or other unique identifier) of the first user 120, a network ID (identification) of the first financial institution, polices governing network behavior of the mobile devices, a one-time use credit card number, and/or biometric data provided by the first user 120. While an example token is described herein, it is to be understood that most any token or instruction can be employed without departing from the spirit and/or scope of the innovation herein.

The CDN server 110 searches the CDN for available couriers (130, 160, 170) for access to and delivery of cash. During the search, the location (e.g., geo-location), cash reserves, available currency, and proximity to the first user of potential couriers within a preset range are displayed on the mobile device associated with the first user 120 next to icons representing the potential second users (130, 160, 170). The first user 120 then selects an appropriate courier from among the plurality of available couriers as desired. All network users regularly update the CDN server 110 as to their location, and, if applicable, the status of their cash reserves. In aspects, this update occurs dynamically in real- or near real-time. Upon registering with the CDN all users register with the CDN or their respective banks (CDN member banks) as cash deliverers, cash recipients, or both. Users register with their mobile phones so that their location is always visible to the network.

When the courier arrives, the first user 120 presents the token to the courier 130 via their respective mobile devices in order to authenticate the first user 120 prior to delivering cash to the first user 120. The first user 120 receives cash user from the courier 130. The first bank server 140, automatically upon receipt of the cash by the first user 120, executes an electronic funds transfer to a second bank server 150 associated with a second financial institution, associated with the second user 130 in the amount of the cash delivered to the first user 120 and a previously specified commission.

Preferably, immediately upon logging on to the CDN 100, users are prompted for authentication in the form of a personal identification number (PIN). Other forms of authentication including, but not limited to, biometrics, etc. can be employed without departing from the spirit and/or scope of the innovation as described.

In some embodiments, the courier may take the form of an automated vehicle or car (or other vehicle, e.g., drone). The automated car may be equipped with an automatic teller machine (ATM) card printer and operative to produce a replacement ATM card for the first user upon request, utilizing information gleaned from databases housed at the first bank server 140 or CDN server 110. Additionally, the automated car may be equipped with a check printer operative to print checks for the first user 120 upon request, utilizing account information gleaned from databases housed at the first bank server 140 or CDN server 110. The automated car may also be equipped with a camera to facilitate confirmation of transactions of verification of user identities. Automated cars may be dispatched to users in response to helpdesk requests. Automated cars may also be equipped with card readers, allowing users to verify their identities using their ATM cards in lieu of a token.

FIG. 2 illustrates an example flow diagram indicative of the method of operation of the system 200 depicted in FIG. 1. The method steps (request cash delivery 210, generate token identifying first user (e.g. mobile device) 220, search CDN for second user 230, select second user from a plurality of users 240, send token to second user for authentication 250, receive cash at first bank server 260, and send repayment and commission to second bank server 270) are described in detail above with regard to the system components of FIG. 1.

It is to be appreciated that, as used herein "user" can be read interchangeably with "mobile device", "device" or the like without departing from the spirit and/or scope of the innovation as disclosed and claimed herein.

Figure 3:
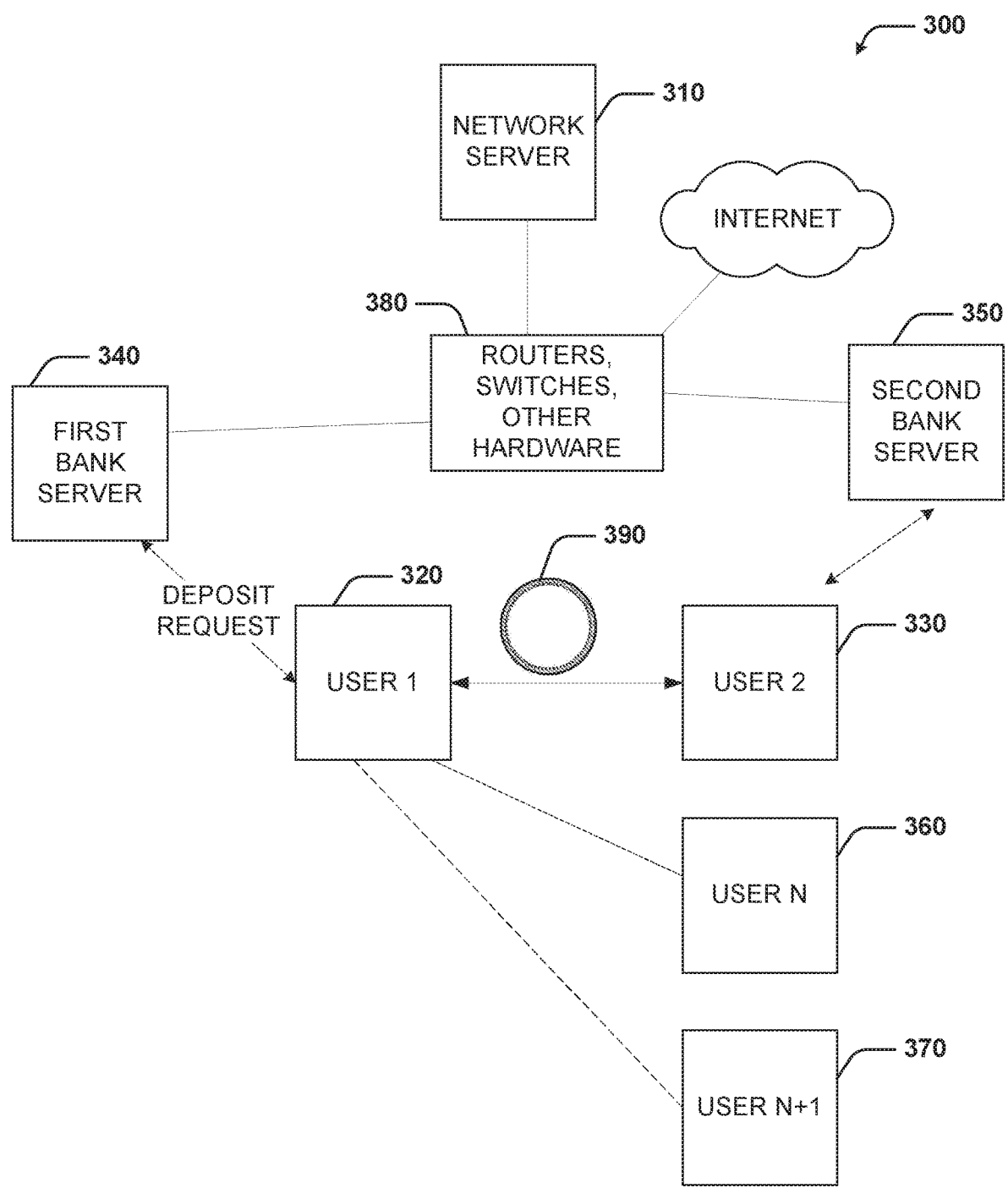
FIG. 3 illustrates an example system block diagram of a cash delivery network that facilitates the collection of cash by a courier from a network user.
Figure 4:
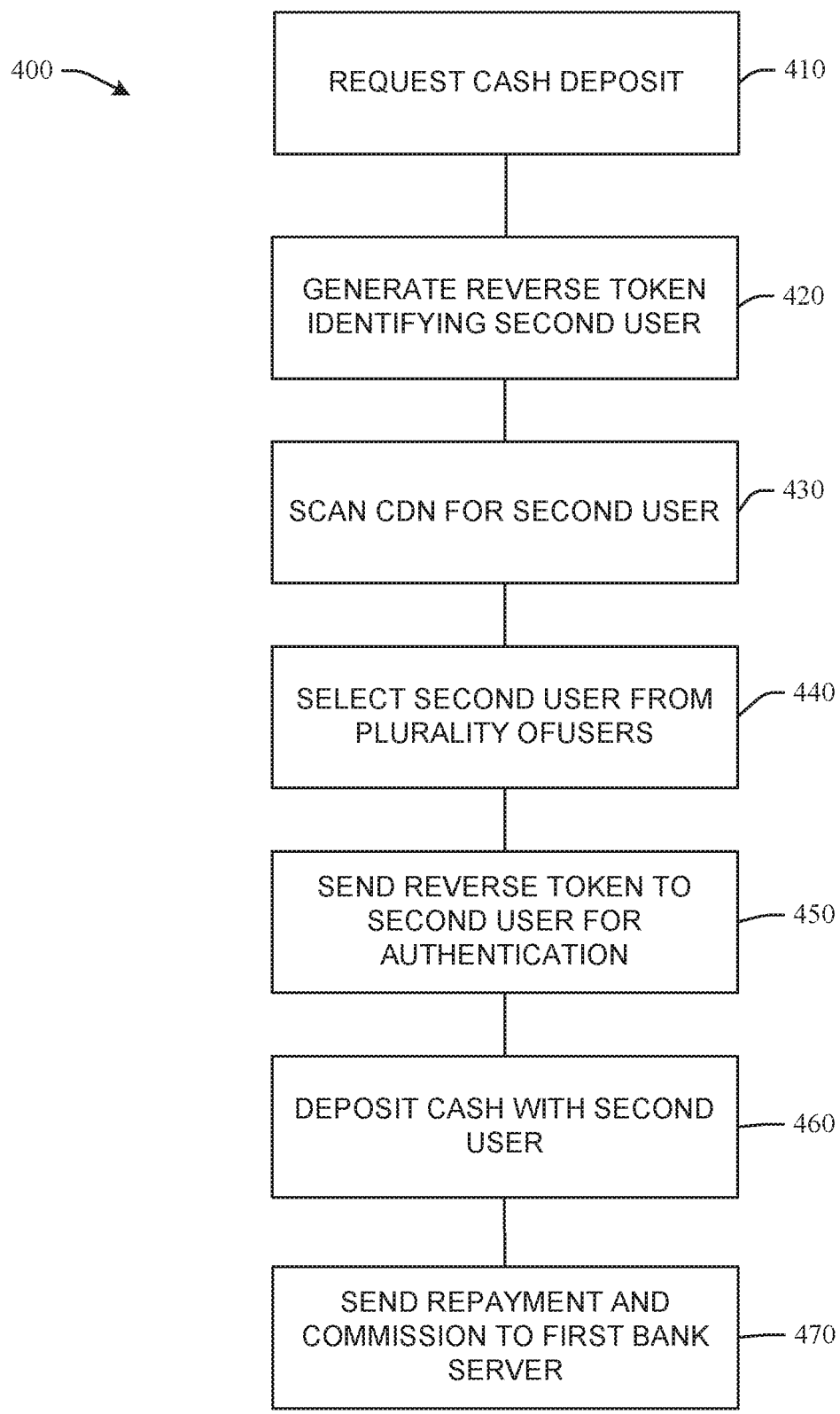
FIG. 4 illustrates an example flow diagram indicative of the method of operation of the system depicted in FIG. 3.

FIGS. 3 and 4 are directed toward the depositing of cash with a courier from a network user or subscriber. While these figures (and the figures that follow) describe specific examples of a cash deposit system in accordance with the innovation, it will be appreciated that alternative aspects exist that are to be included within the spirit and scope of the innovation as described herein.

FIG. 3 illustrates an example system block diagram of a cash delivery network (CDN) 300, managed by a CDN server 310 that facilitates the depositing of cash from a first network user 320 to a selected courier (second user) 330 chosen from among a plurality of potential second users (330, 360, 370). The CDN server 310 hosts a cash distribution application. Network users (320, 330, 360, and 370) access the cash delivery application as clients. The CDN contains routers, switches, and other appropriate hardware 380 and connects to the internet or other appropriate network.

The first network user 320 makes a request to deposit cash. In an example, the request is made via a digital wallet (not shown) associated with the first user 320. In response, a first bank server 340 associated with a first financial institution, associated with the first user 320, accepts the request and authorizes a cash deposit.

The CDN server 310 scans the CDN to find an appropriate second user with which to make a cash deposit. During the scanning, the location and proximity to the first user of potential couriers within a preset range are displayed on the digital wallet associated with the first user 320 next to icons representing the potential second users (330, 360, 370). The first user 320 then selects an appropriate courier from among the plurality of available couriers as desired. As described supra, all network users regularly update the CDN server 310 as to their location. Upon registering with the CDN all users register with the CDN or their respective banks (CDN member banks) as cash deliverers, cash recipients, or both. Users register with their digital wallets so that their location is always visible to the network.

After a courier 330, associated with a digital wallet (not shown), has been selected, the first bank server 340 receives information over the CDN from the courier 330 that may include at least a phone number of the second user/courier 330, a network ID of a second financial institution associated with a second banking server 350 associated with the second user 330, polices governing network behavior of the digital wallets, a one-time use credit card number, and/or biometric data provided by the second user 330. The first bank server 340 uses this information to create a reverse token 390, which is a request to receive money online.

Upon the arrival of the second user 330, the first user 320 presents the reverse token 390 to the second user 330 via their respective digital wallets. The second bank server 350 receives and authenticates the reverse token 390, and authorizes the second user 330, to receive a cash deposit from the first user 320. The first user 320 deposits cash with the courier 330.

The second bank server 350, automatically upon receipt of the cash by the courier 330, executes an electronic funds transfer to the first bank server 340 in the amount of the cash delivered to the courier 330 and a previously specified commission.

In some embodiments, it will be appreciated that checks (or combinations of checks and cash) may be deposited in lieu of cash.

In some embodiments, in lieu of receiving electronic credit at the first financial institution in return for his deposit, the first user 330 may simply have the credit applied directly to his digital wallet and subsequently utilize all or part of funds received in exchange for his deposit to cover fees incurred for goods and/or services.

In some embodiments the first user 320 may deposit foreign currency with the courier 330 and receive U.S. currency in accordance with the appropriate exchange rate.

Preferably, immediately upon logging on to the CDN 300, users (e.g. mobile devices) are prompted for authentication in the form of a PIN or other appropriate authentication.

FIG. 4 illustrates an example flow diagram indicative of the method of operation 400 of the system depicted in FIG. 3. The method steps (request cash deposit 410, generate reverse token identifying second user 420, scan CDN for second user 430, select second user from a plurality of users 440, send reverse token to second user for authentication 450, deposit cash with second user 460, and send repayment and commission to first bank server 470) are described in detail above with regard to the components of FIG. 5.

Figure 5:
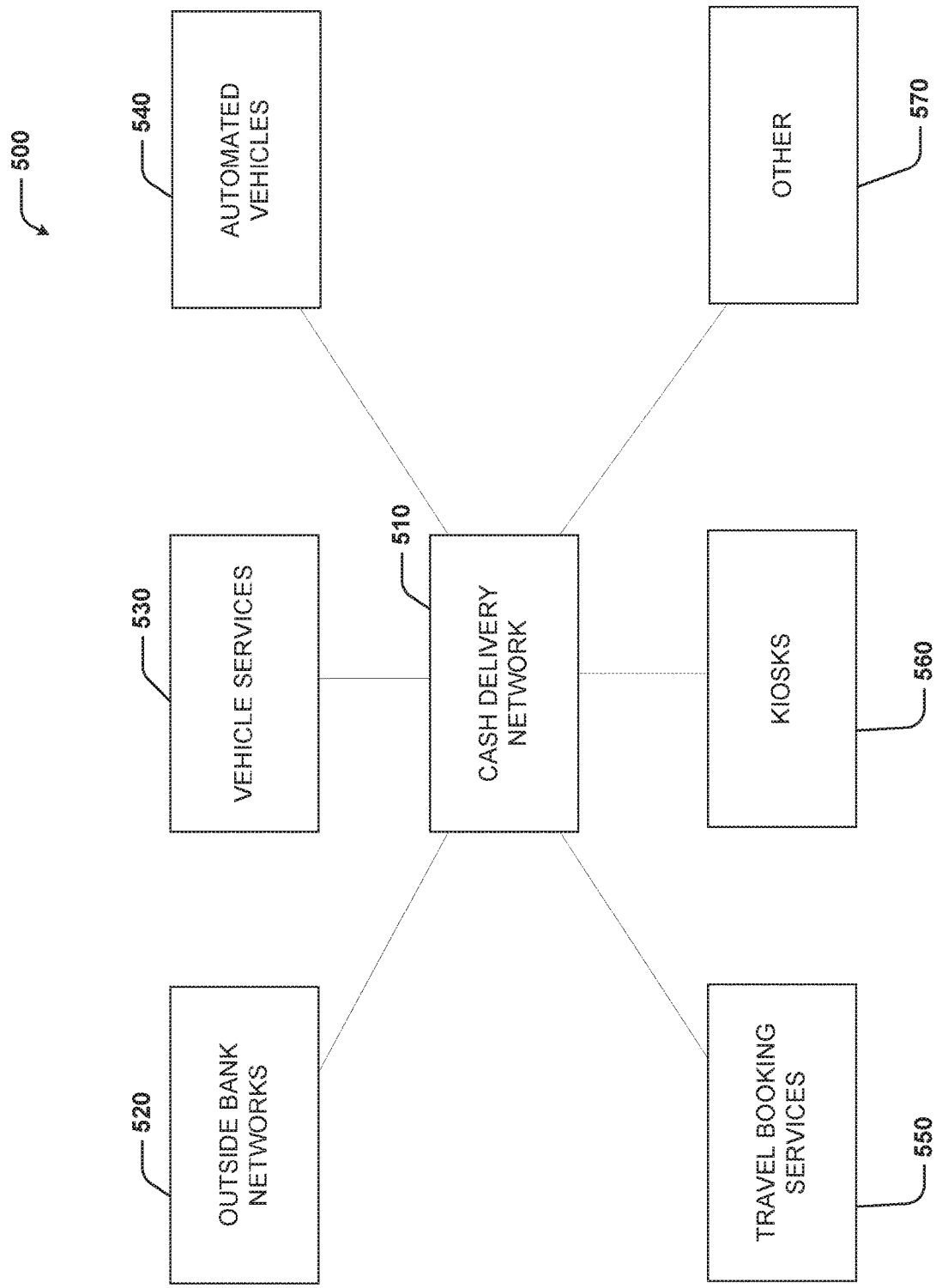
FIG. 5 illustrates an example block diagram of a cash delivery framework that facilities the delivery of cash to a user of a cash delivery network via one of a plurality of cash delivery elements.

FIG. 5 illustrates an example block diagram of a cash delivery framework 500 that facilities the delivery of cash to a user of a cash delivery network CDN 510 via one of a plurality of cash delivery elements.

The CDN is managed by servers associated with a bank or group of banks (or other financial institution). In examples, the CDN includes bank servers, associated with a bank or a group of banks that host a cash distribution application. The servers manage the framework and thus have visibility as to the status of the remaining framework elements. The CDN includes mobile or stationary computing devices associated with network users, the computing devices being operative to access the cash delivery application as clients. The CDN also includes routers, switches, and other appropriate hardware 180 and connects to the internet (or other appropriate network). For the sake of simplicity, the network elements are not shown. However, those skilled in the art will appreciate network elements to effect the disclosed features, functions and/or benefits.

The framework 500 also includes banking networks outside the CDN 520. These networks are utilized, for example, for roaming purposes. The financial institution with which a given user is associated may charge a higher fee to access the cash delivery application through outside networks 520.

Cash delivery elements include, but are not limited to: manned vehicle services such as ride-sharing services, taxi services, and limousine services 530, dedicated automated vehicles 540, travel booking services 550, kiosks at hotels, airports, and authorized businesses 560, and other applicable mobile or stationary means of dispensing (or collecting) cash 570.

The cash delivery elements are operative to serve as locations or entities at which or from which a user may receive cash or electronic credit upon request to and authorization from the CDN 510. Servers within the CDN 510 are operative to prompt a user immediately after he accesses the application, to enter a passcode to access the cash delivery system via a first bank server tied to a bank at which the user has an account.

Upon receiving a request for cash delivery from the user, the first bank server generates a token, the token being an online request to receive cash. The token comprises a phone number of the first user, a network ID of the first financial institution, and polices governing network behavior of the mobile devices, biometric information provided by the user, and a one-time use credit card number.

The first bank server is operative to present the token to a cash delivery element to authenticate the first user prior to delivering cash to the user. Upon authenticating the token, the cash delivery element is operative to deliver cash to the user. Immediately after receipt of cash, the first bank server automatically transfers electronic credit for the cash delivered plus a predetermined commission to a second bank server tied to a bank at which the cash delivery element has an account.

In some embodiments, the CDN 510 is operative to inform the user of the proximity and cash reserves of cash delivery elements and allow the user to select the desired cash delivery element.

In some embodiments, the various potential second users negotiate commission rates with the CDN 510 in an effort to make themselves more competitive by offering lower rates.

In some embodiments, the CDN 510 is operative to provide foreign currency in lieu of U.S. dollars upon request from the user in accordance with the appropriate exchange rate.

In some embodiments, the CDN 510 is operative, upon request from a user, to deliver cash to an identified third party, wherein the CDN 510 sends a token to a mobile device associated with the third party generated based on information provided by the user, and the third party must present the token to the cash delivery element prior to receiving cash.

In some embodiments, the CDN 510 is operative to facilitate a loan between a cash delivery element and a user upon request by the user and with the approval of the cash delivery element. In such an instance, the borrower will be subject to a smart contract that stipulates that money will be automatically transferred from the bank account of the borrower to the bank account of the lender, at a specified later period.

Figure 6:
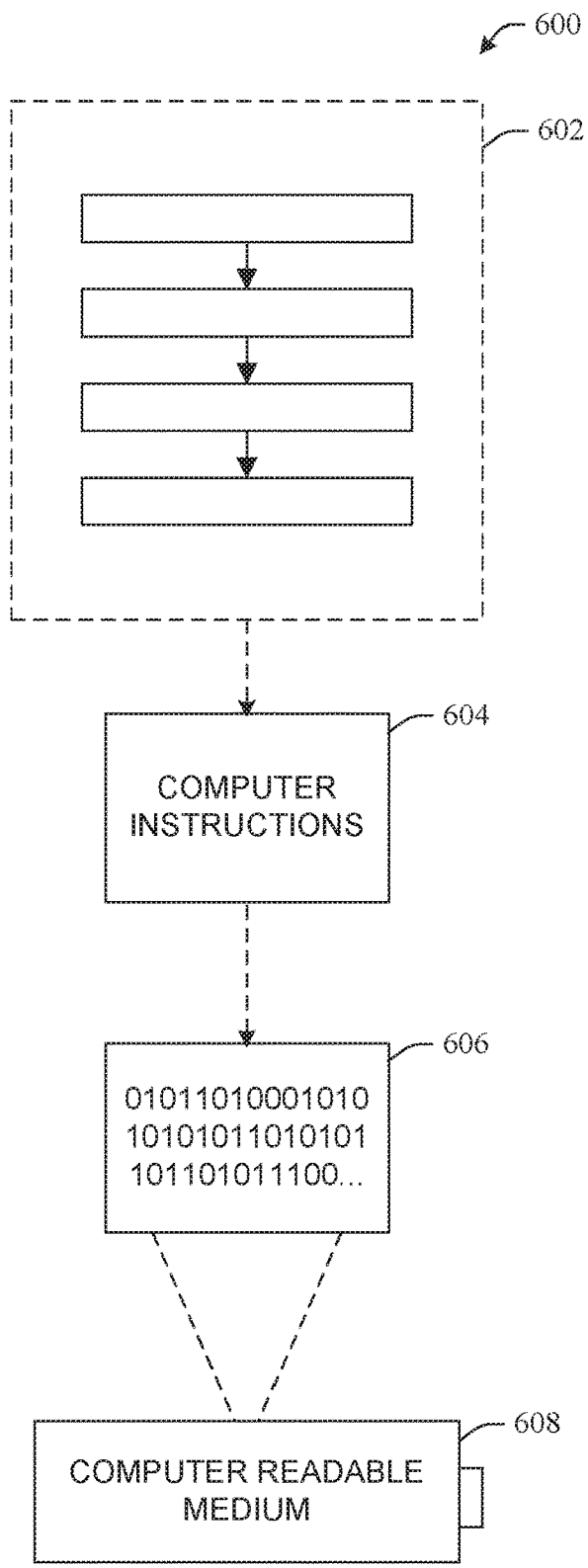
FIG. 6 illustrates a computer-readable medium or computer-readable device comprising processor-executable instructions configured to embody one or more of the provisions set forth herein, according to some embodiments.

Still another embodiment can involve a computer-readable medium comprising processor-executable instructions configured to implement one or more embodiments of the techniques presented herein. An embodiment of a computer-readable medium or a computer-readable device that is devised in these ways is illustrated in FIG. 6, wherein an implementation 600 comprises a computer-readable medium 608, such as a CD-R, DVD-R, flash drive, a platter of a hard disk drive, etc., on which is encoded computer-readable data 606. This computer-readable data 606, such as binary data comprising a plurality of zero's and one's as shown in 606, in turn comprises a set of computer instructions 604 configured to operate according to one or more of the principles set forth herein. In one such embodiment 600, the processor-executable computer instructions 604 is configured to perform a method 602, such as at least a portion of one or more of the methods described in connection with embodiments disclosed herein. In another embodiment, the processor-executable instructions 604 are configured to implement a system, such as at least a portion of one or more of the systems described in connection with embodiments disclosed herein. Many such computer-readable media can be devised by those of ordinary skill in the art that are configured to operate in accordance with the techniques presented herein.

Figure 7:
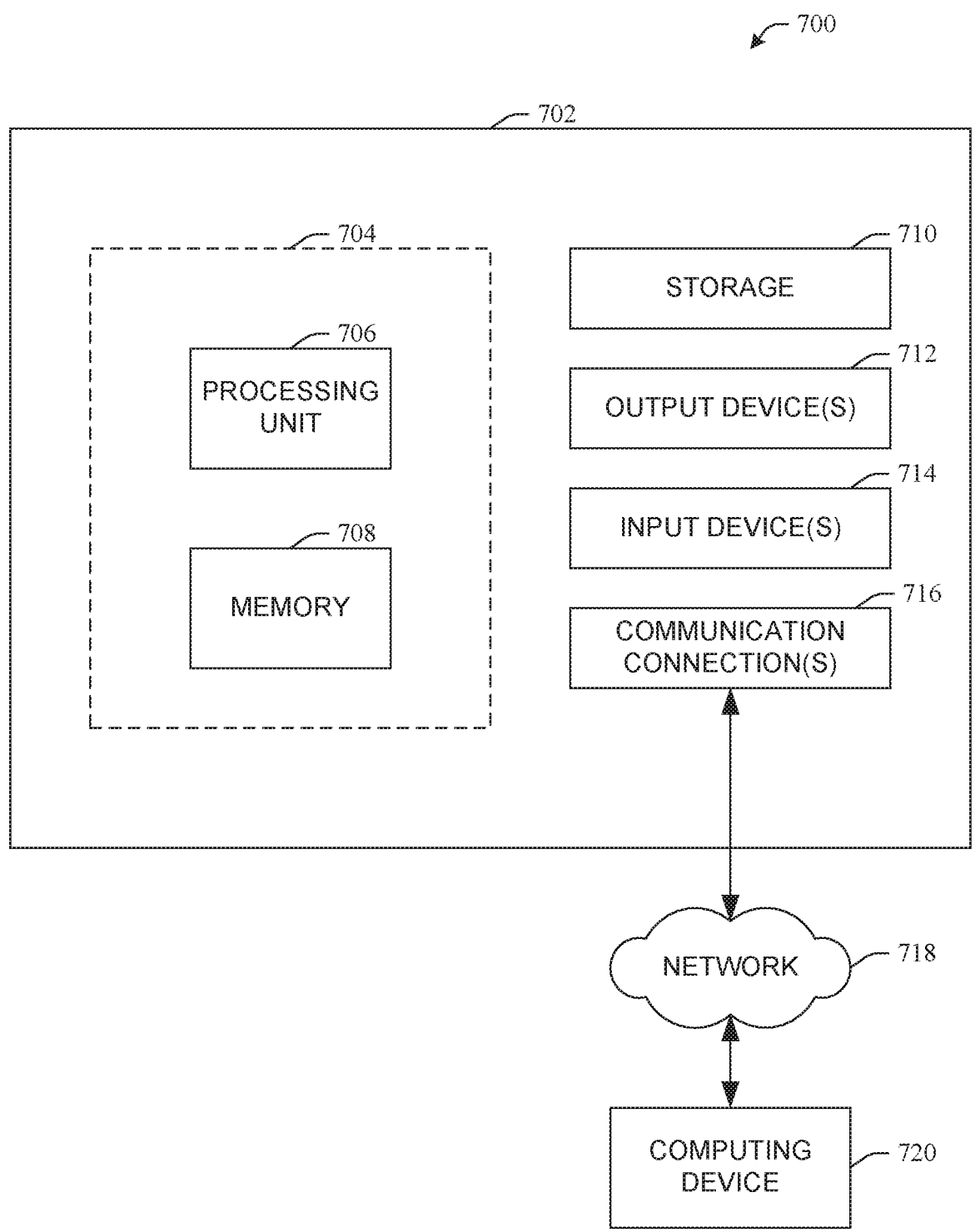
FIG. 7 illustrates a computing environment where one or more of the provisions set forth herein can be implemented, according to some embodiments.

With reference to FIG. 7 and the following discussion provide a description of a suitable computing environment in which embodiments of one or more of the provisions set forth herein can be implemented. The operating environment of FIG. 7 is only one example of a suitable operating environment and is not intended to suggest any limitation as to the scope of use or functionality of the operating environment. Example computing devices include, but are not limited to, personal computers, server computers, hand-held or laptop devices, mobile devices, such as mobile phones, Personal Digital Assistants (PDAs), media players, tablets, and the like, multiprocessor systems, consumer electronics, mini computers, mainframe computers, distributed computing environments that include any of the above systems or devices, and the like.

Generally, embodiments are described in the general context of "computer readable instructions" being executed by one or more computing devices. Computer readable instructions are distributed via computer readable media as will be discussed below. Computer readable instructions can be implemented as program modules, such as functions, objects, Application Programming Interfaces (APIs), data structures, and the like, that perform particular tasks or implement particular abstract data types. Typically, the functionality of the computer readable instructions can be combined or distributed as desired in various environments.

FIG. 7 illustrates a system 700 comprising a computing device 702 configured to implement one or more embodiments provided herein. In one configuration, computing device 702 can include at least one processing unit 706 and memory 708. Depending on the exact configuration and type of computing device, memory 708 may be volatile, such as RAM, nonvolatile, such as ROM, flash memory, etc., or some combination of the two. This configuration is illustrated in FIG. 7 by dashed line 704.

In these or other embodiments, device 702 can include additional features or functionality. For example, device 702 can also include additional storage such as removable storage or non-removable storage, including, but not limited to, magnetic storage, optical storage, and the like. Such additional storage is illustrated in FIG. 7 by storage 710. In some embodiments, computer readable instructions to implement one or more embodiments provided herein are in storage 710. Storage 710 can also store other computer readable instructions to implement an operating system, an application program, and the like. Computer readable instructions can be accessed in memory 708 for execution by processing unit 706, for example.

The term "computer readable media" as used herein includes computer storage media. Computer storage media includes volatile and nonvolatile, non-transitory, removable and non-removable media implemented in any method or technology for storage of information such as computer readable instructions or other data. Memory 708 and storage 710 are examples of computer storage media. Computer storage media includes, but is not limited to, RAM, ROM, EEPROM, flash memory or other memory technology, CD-ROM, Digital Versatile Disks (DVDs) or other optical storage, magnetic cassettes, magnetic tape, magnetic disk storage or other magnetic storage devices, or any other medium which can be used to store the desired information and which can be accessed by device 702. Any such computer storage media can be part of device 702.

The term "computer readable media" includes communication media. Communication media typically embodies computer readable instructions or other data in a "modulated data signal" such as a carrier wave or other transport mechanism and includes any information delivery media. The term "modulated data signal" includes a signal that has one or more of its characteristics set or changed in such a manner as to encode information in the signal.

Device 702 can include one or more input devices 714 such as keyboard, mouse, pen, voice input device, touch input device, infrared cameras, video input devices, or any other input device. One or more output devices 712 such as one or more displays, speakers, printers, or any other output device can also be included in device 702. The one or more input devices 714 and/or one or more output devices 712 can be connected to device 702 via a wired connection, wireless connection, or any combination thereof. In some embodiments, one or more input devices or output devices from another computing device can be used as input device(s) 714 or output device(s) 712 for computing device 702. Device 702 can also include one or more communication connections 716 that can facilitate communications with one or more other devices 720 by means of a communications network 718, which can be wired, wireless, or any combination thereof, and can include ad hoc networks, intranets, the Internet, or substantially any other communications network that can allow device 702 to communicate with at least one other computing device 720.

What has been described above includes examples of the innovation. It is, of course, not possible to describe every conceivable combination of components or methodologies for purposes of describing the subject innovation, but one of ordinary skill in the art may recognize that many further combinations and permutations of the innovation are possible. Accordingly, the innovation is intended to embrace all such alterations, modifications and variations that fall within the spirit and scope of the appended claims. Furthermore, to the extent that the term "includes" is used in either the detailed description or the claims, such term is intended to be inclusive in a manner similar to the term "comprising" as "comprising" is interpreted when employed as a transitional word in a claim.

What is claimed is:

1. A method comprising:
    generating, by a bank server, a token, based on a request for an amount of cash from a first digital wallet associated with an account at a first financial institution, wherein the token is a commitment to electronically pay an amount of money upon receipt of the amount of cash, and wherein the token includes:
        a first set of information associated with a user of the account, wherein the first set of information includes at least a unique identifier of the user; and
        a second set of information associated with the first financial institution, wherein the second set of information includes at least a first network identification of the first financial institution;
    extracting, by the bank server, a location associated with the first digital wallet;
    scanning via the bank server, a cash delivery network (CDN) hosted by a CDN server and finding a second digital wallet to deliver the amount of cash, the second digital wallet being selected from a plurality of digital wallets associated with a plurality of respective users, wherein:
        the CDN server is operable to facilitate a delivery of the amount of cash from a user associated with the second digital wallet to the user associated with the first digital wallet;
        the second digital wallet is associated with an automated vehicle and is selected based on a proximity of the automated vehicle to the location of the user associated with the first digital wallet; and
        the plurality of digital wallets associated with the plurality of respective users comprises:
            a first set of digital wallets associated with a first set of respective users, wherein the first set of digital wallets are characterized as being in network with the first financial institution; and
    a second set of digital wallets associated with a second set of respective users, wherein the second set of digital wallets are characterized as being out of network with the first financial institution and each digital wallet of the second set of digital wallets being associated with a predetermined fee that is higher than a predetermined fee associated with any wallet of the first set of digital wallets;
    sending the token from the bank server to the second digital wallet;
    authenticating, based on the token, the first digital wallet and the second digital wallet;
    delivering, using the automated vehicle, the amount of cash from the user associated with the second digital wallet to the user associated with the first digital wallet, wherein the automated vehicle uses the location of the user associated with the first digital wallet to perform the delivery; and
    upon receipt of the amount of cash, electronically sending the amount of money from the account associated with the first digital wallet to the second digital wallet.

2. The method of claim 1, wherein the unique identifier comprises a phone number associated with the first digital wallet, and wherein the second set of information further includes one or more of: policies governing network behavior and a one-time use credit card number.

3. The method of claim 1, wherein the unique identifier comprises biometric data associated with the user of the first digital wallet.

4. The method of claim 1, further comprising displaying to the user of the first digital wallet a location of one or more second digital wallets within a preset range of the location associated with the first digital wallet.

5. The method of claim 4, further comprising receiving data associated with an amount of available cash associated with the second digital wallet located within the preset range of the location associated with the first digital wallet.

6. The method of claim 5, further comprising displaying to the user of the first digital wallet the amount of available cash associated with the second digital wallet.

7. The method of claim 1, wherein the automated vehicle is equipped with an automatic teller machine (ATM) card printer and operative to produce a replacement ATM card for the user.

8. A non-transitory computer readable medium comprising program code that, when executed by one or more processors, is configured to cause the one or more processors to:
    generate, by a bank server, a token, based on a request for an amount of cash from a first digital wallet associated with an account at a first financial institution, wherein the token is a commitment to electronically pay an amount of money upon receipt of the amount of cash, and wherein the token includes:
        a first set of information associated with a user of the account, wherein the first set of information includes at least a unique identifier of the user; and
        a second set of information associated with the first financial institution, wherein the second set of information includes at least a first network identification of the first financial institution;
    extract, by the bank server, a location associated with the first digital wallet;
    scan via the bank server, a cash delivery network (CDN) hosted by a CDN server and finding a second digital wallet to deliver the amount of cash, the second digital wallet being selected from a plurality of digital wallets associated with a plurality of respective users, wherein:
        the CDN server is operable to facilitate a delivery of the amount of cash from a user associated with the second digital wallet to the user associated with the first digital wallet;
        the second digital wallet is associated with an automated vehicle and is selected based on a proximity of the automated vehicle to the location of the user associated with the first digital wallet; and
        the plurality of digital wallets associated with the plurality of respective users comprises:

a first set of digital wallets associated with a first set of respective users, wherein the first set of digital wallets are characterized as being in network with the first financial institution; and a second set of digital wallets associated with a second set of respective users, wherein the second set of digital wallets are characterized as being out of network with the first financial institution and each digital wallet of the second set of digital wallets being associated with a predetermined fee that is higher than a predetermined fee associated with any wallet of the first set of digital wallets;

send the token from the bank server to the second digital wallet;

authenticate, based on the token, the first digital wallet and the second digital wallet;

deliver, using the automated vehicle, the amount of cash from the user associated with the second digital wallet to the user associated with the first digital wallet, wherein the automated vehicle uses the location of the user associated with the first digital wallet to perform the delivery; and upon receipt of the amount of cash, electronically send the amount of money from the account associated with the first digital wallet to the second digital wallet.

9. The non-transitory computer readable medium of claim 8, wherein the unique identifier comprises a phone number associated with the first digital wallet, and wherein the second set of information further includes one or more of: policies governing network behavior and a one-time use credit card number.

10. The non-transitory computer readable medium of claim 8, wherein the unique identifier comprises biometric data associated with the user of the first digital wallet.

11. The non-transitory computer readable medium of claim 8, further comprising program code that, when executed by one or more processors is configured to cause the one or more processors to display to the user of the first digital wallet a location of one or more second digital wallets within a preset range of the location associated with the first digital wallet.

12. The non-transitory computer readable medium of claim 11, further comprising program code that, when executed by one or more processors is configured to cause the one or more processors to receive data associated with an amount of available cash associated with the second digital wallet located within the preset range of the location associated with the first digital wallet.

13. The non-transitory computer readable medium of claim 12, further comprising program code that, when executed by one or more processors is configured to cause the one or more processors to display to the user of the first digital wallet the amount of available cash associated with the second digital wallet.

14. A cash delivery system comprising:
one or more processors coupled to a memory that stores instructions that, when executed by the one or more processors, causes the one or more processors to:
generate, by a bank server, a token, based on a request for an amount of cash from a first digital wallet associated with an account at a first financial institution, wherein the token is a commitment to electronically pay an amount of money upon receipt of the amount of cash, and wherein the token includes:
a first set of information associated with a user of the account, wherein the first set of information includes at least a unique identifier of the user; and a second set of information associated with the first financial institution, wherein the second set of information includes at least a first network identification of the first financial institution;

extract, by the bank server, a location associated with the first digital wallet;

scan via the bank server, a cash delivery network (CDN) hosted by a CDN server and finding a second digital wallet to deliver the amount of cash, the second digital wallet being selected from a plurality of digital wallets associated with a plurality of respective users, wherein:

the CDN server is operable to facilitate a delivery of the amount of cash from a user associated with the second digital wallet to the user associated with the first digital wallet; and wherein the second digital wallet is associated with an automated vehicle and is selected based on a proximity of the automated vehicle to the location of the user associated with the first digital wallet; and the plurality of digital wallets associated with the plurality of respective users comprises:
a first set of digital wallets associated with a first set of respective users, wherein the first set of digital wallets are characterized as being in network with the first financial institution; and
a second set of digital wallets associated with a second set of respective users, wherein the second set of digital wallets are characterized as being out of network with the first financial institution and each digital wallet of the second set of digital wallets being associated with a predetermined fee that is higher than a predetermined fee associated with any wallet of the first set of digital wallets;

send the token from the bank server to the second digital wallet;

authenticate, based on the token, the first digital wallet and the second digital wallet;

deliver, using the automated vehicle, the amount of cash from the user associated with the second digital wallet to the user associated with the first digital wallet, wherein the automated vehicle uses the location of the user associated with the first digital wallet to perform the delivery; and upon receipt of the amount of cash, electronically send the amount of money from the account associated with the first digital wallet to the second digital wallet.

15. The method of claim 1, wherein the automated vehicle is configured to access one or more databases housed at the bank server or the CDN server to print checks for the first user based on information about the first user obtained from the one or more databases.

16. The method of claim 1, wherein the automated vehicle is equipped with a camera to verify an identity of the first user and to confirm successful completion of the delivery of the amount of cash.

17. The non-transitory computer readable medium of claim 8, wherein the automated vehicle is equipped with an automatic teller machine (ATM) card printer and operative to produce a replacement ATM card for the first user based on accessing one or more databases houses at the bank server or the CDN server to obtain information about the first user.

18. The non-transitory computer readable medium of claim 8, wherein the automated vehicle is equipped with a camera to verify an identity of the first user and to confirm successful completion of the delivery of the amount of cash.

19. The cash delivery system of claim 14, wherein the automated vehicle is equipped with an automatic teller machine (ATM) card printer and operative to produce a replacement ATM card for the first user based on accessing one or more databases houses at the bank server or the CDN server to obtain information about the first user.

20. The cash delivery system of claim 14, wherein the automated vehicle is equipped with a camera to verify an identity of the first user and to confirm successful completion of the delivery of the amount of cash.

* * * * *